April 23, 1968  H. PILCHER  3,379,393
REEL-MOUNTED LEVEL WIND APPARATUS
Filed May 18, 1966  4 Sheets-Sheet 1
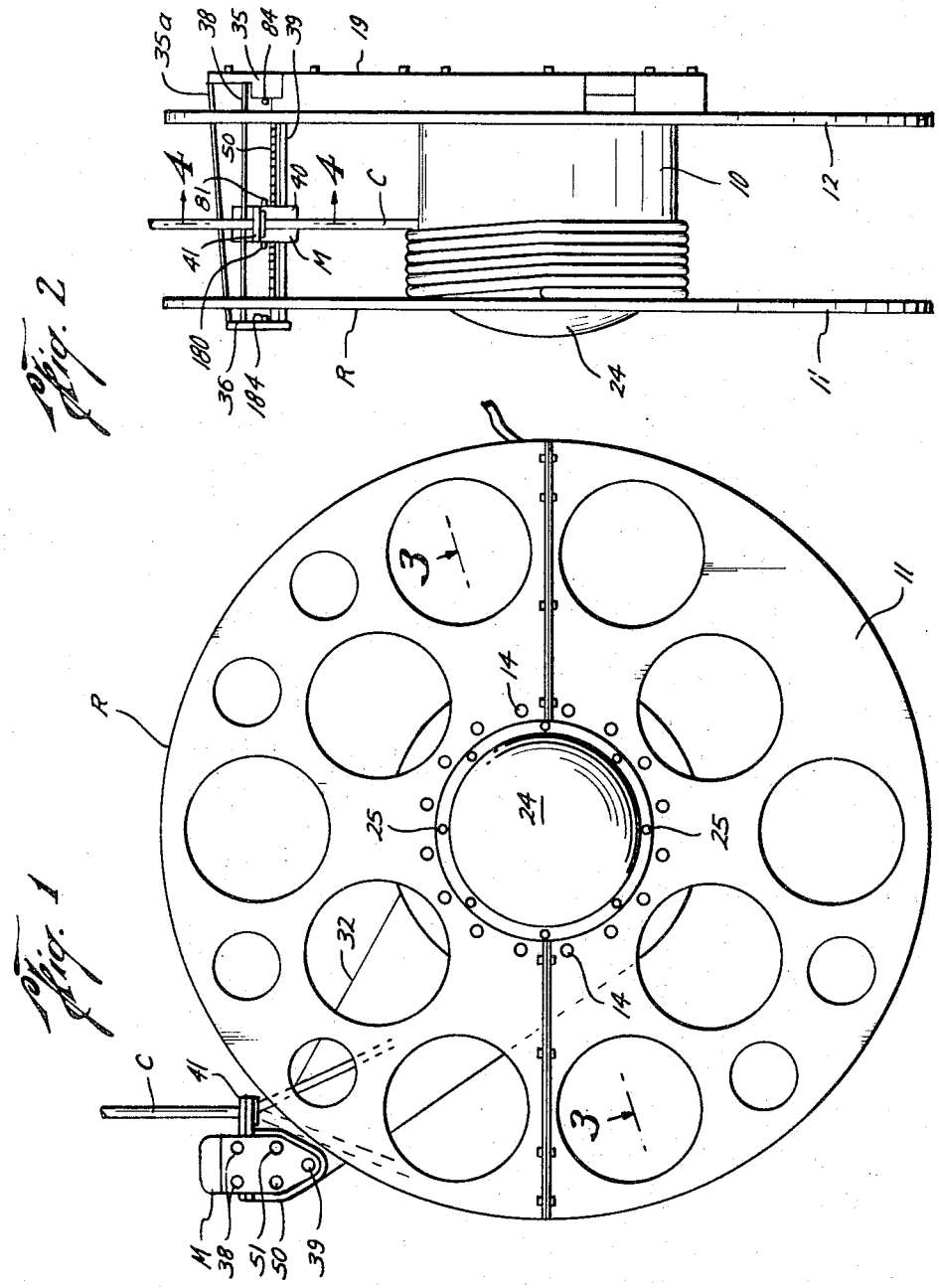
Harold Pilcher
INVENTOR.
BY Hayden & Pravel
ATTORNEYS Harold Pilcher
INVENTOR.

BY Hayden & Pravel
ATTORNEYS

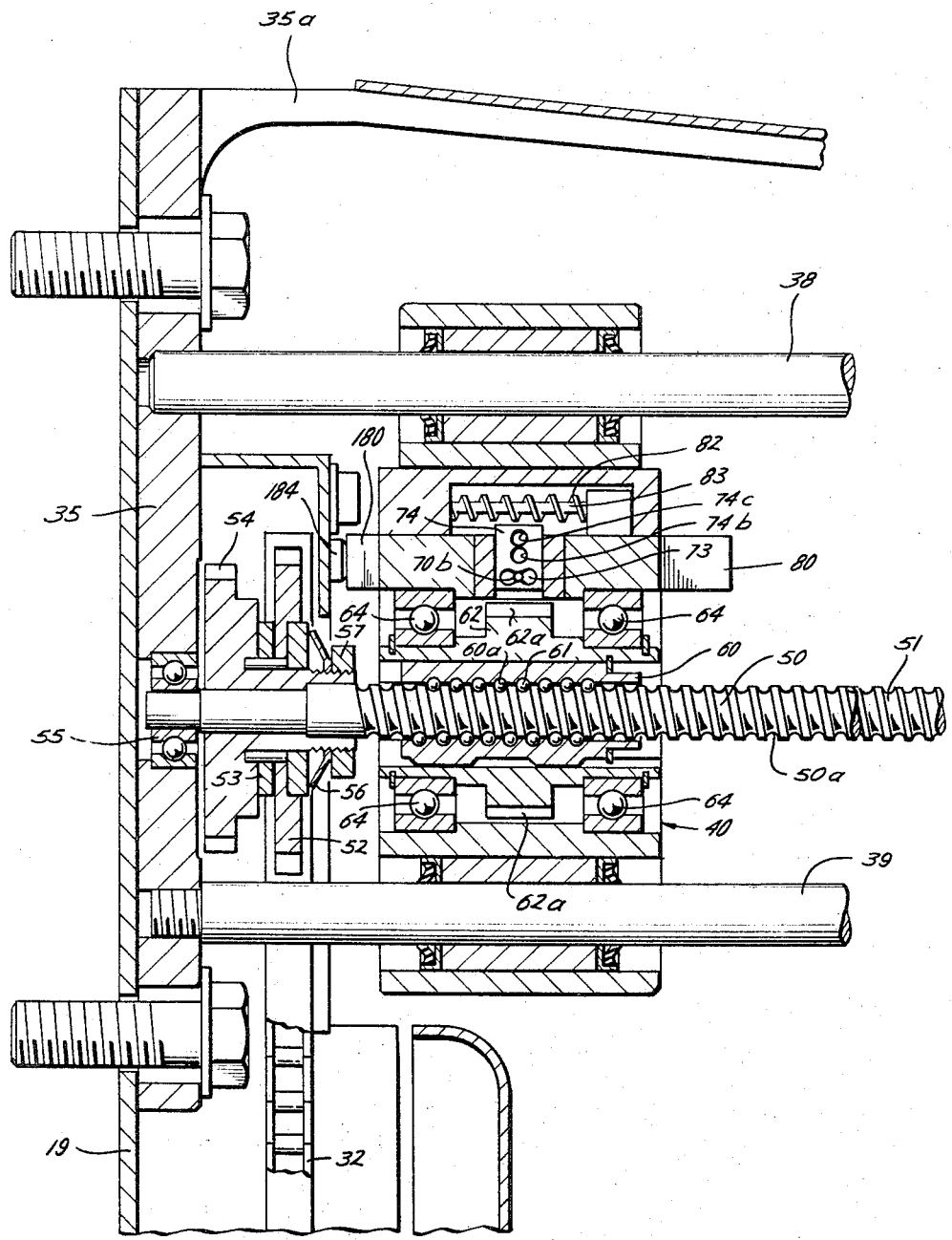

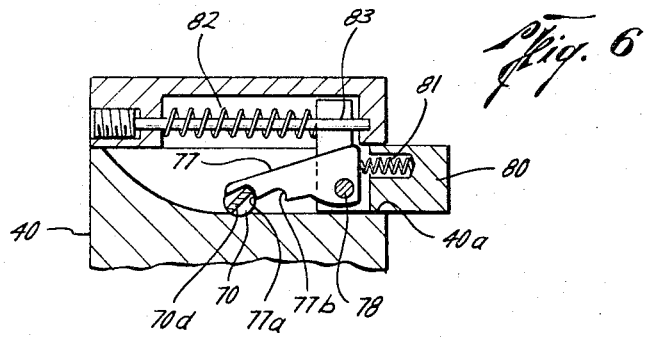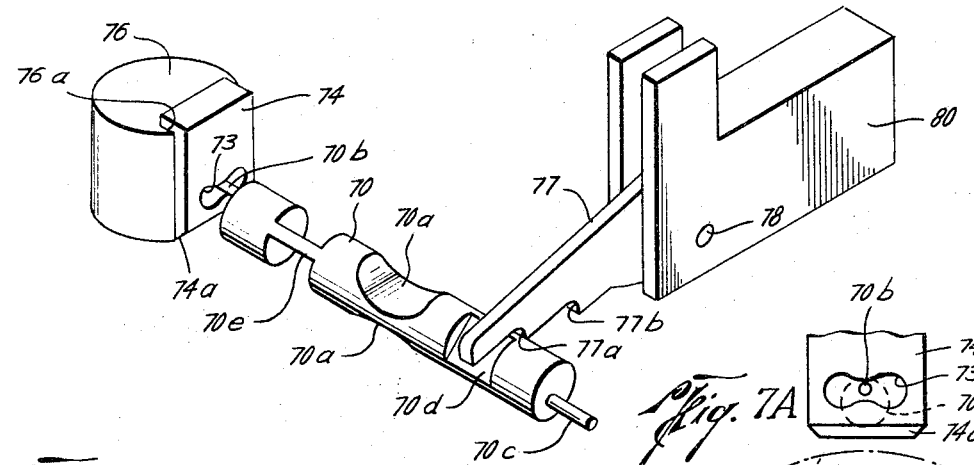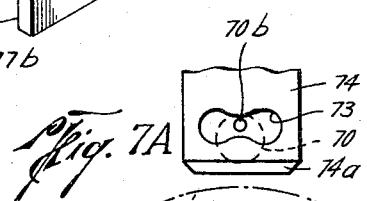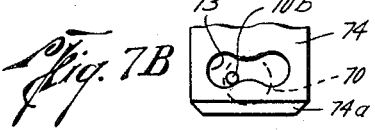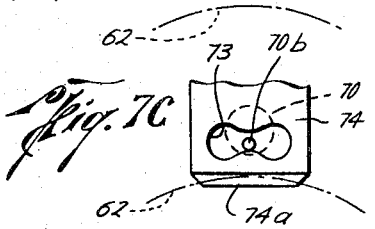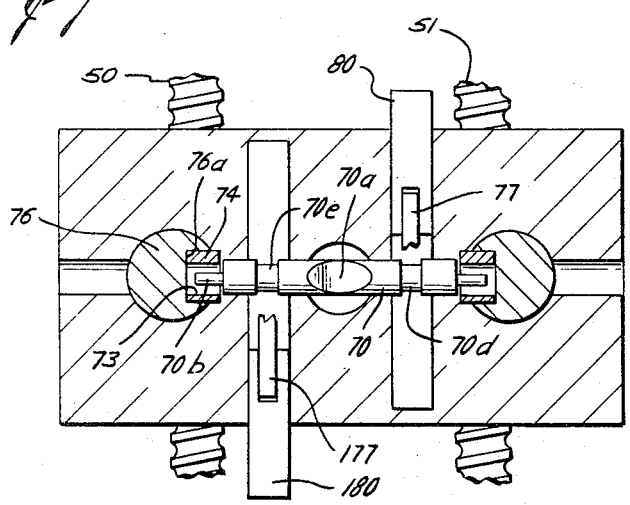
Harold Pilcher
INVENTOR.
BY Hayden & Pravel
ATTORNEYS United States Patent Office 3,379,393
Patented Apr. 23, 1968

3,379,393
REEL-MOUNTED LEVEL WIND APPARATUS
Harold Pilcher, Houston, Tex., assignor to Bowen Tools, Inc., Houston, Tex., a corporation of Texas
Filed May 18, 1966, Ser. No. 551,067
10 Claims. (Cl. 242—158.4)

ABSTRACT OF THE DISCLOSURE

A level wind apparatus wherein a pair of lead screws are employed with a guide block thereon which is automatically reversed in direction at the end of each length of its lateral travel. Means are provided for a second reversing of the direction of movement of the guide block at each end of its lateral travel in the event the direction of feeding of the cable is changed while the guide block is at one end of its travel.

---

An object of this invention is to provide a new and improved level wind apparatus which is mounted on a reel apparatus and which has means therewith for changing the direction of travel at definite points for thereby assuring a proper lay of the cable or the like on the reel as it is wound or unwound therefrom.

Another object of this invention is to provide a new and improved level wind apparatus which is mounted on a reel for winding and unwinding cable or the like on the reel in tightly spooled layers wherein such apparatus accomplishes such spooling even though the cable may be fed to the level wind apparatus with an excessively wide fleet angle.

A particular object of this invention is to provide a new and improved level wind apparatus which has a guide block mounted for reciprocal movement on a pair of lead screws, each of which is alternately engaged by a releasable mounted nut for determining the direction of travel of the level wind apparatus.

Still another object of this invention is to provide a new and improved reel-mounted level wind apparatus wherein a guide block changes its direction of travel at approximately each side of the reel for winding or unwinding but which may be automatically shifted to reverse the feed of the cable either from winding or unwinding or vice versa at any position of the guide block.

The preferred embodiment of this invention will be described hereinafter together with other features thereof, and additional objects will become evident from such description.

The invention will be more readily understood from a reading of the following specification and by reference to the accompanying drawings forming a part thereof wherein an example of the invention is shown and wherein:

FIG. 1 is an elevation of the apparatus of this invention in its preferred embodiment;

FIG. 2 is a side view of the apparatus of FIG. 1 to further illustrate same;

FIG. 5 is a sectional view, partly in elevation, taken on line 5—5 of FIG. 4;

FIG. 6 is a sectional view taken on line 6—6 of FIG. 4;

FIG. 7 is an isometric view illustrating several of the major working parts of the means for automatically reversing the direction of movement of the guide block on the reel;

Figure 4:
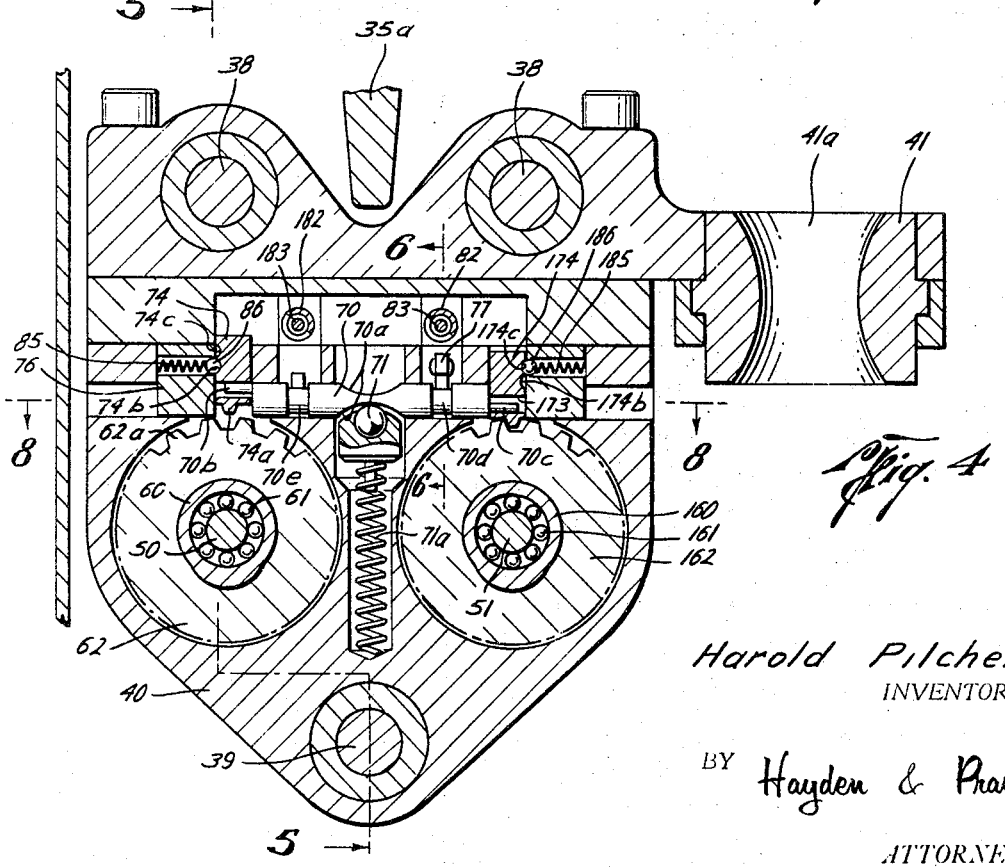
FIG. 4 is a sectional view taken on line 4—4 of FIG. 2.

FIGS. 7A, 7B, and 7C are schematic illustrations of three different positions of the rotatable shaft connected with the reversing mechanism; and FIG. 8 is a view taken on the line 8—8 of FIG. 4 to further illustrate the invention.

In the drawings, the letter R designates a reel upon which a cable C or other similar elongate object is adapted to be spooled or wound by means of a level wind mechanism M. Briefly, the level wind mechanism or apparatus M of this invention provides for the winding and unwinding of the cable C on the reel R in tightly spooled layers which are uniformly and automatically laid.

Figure 3:
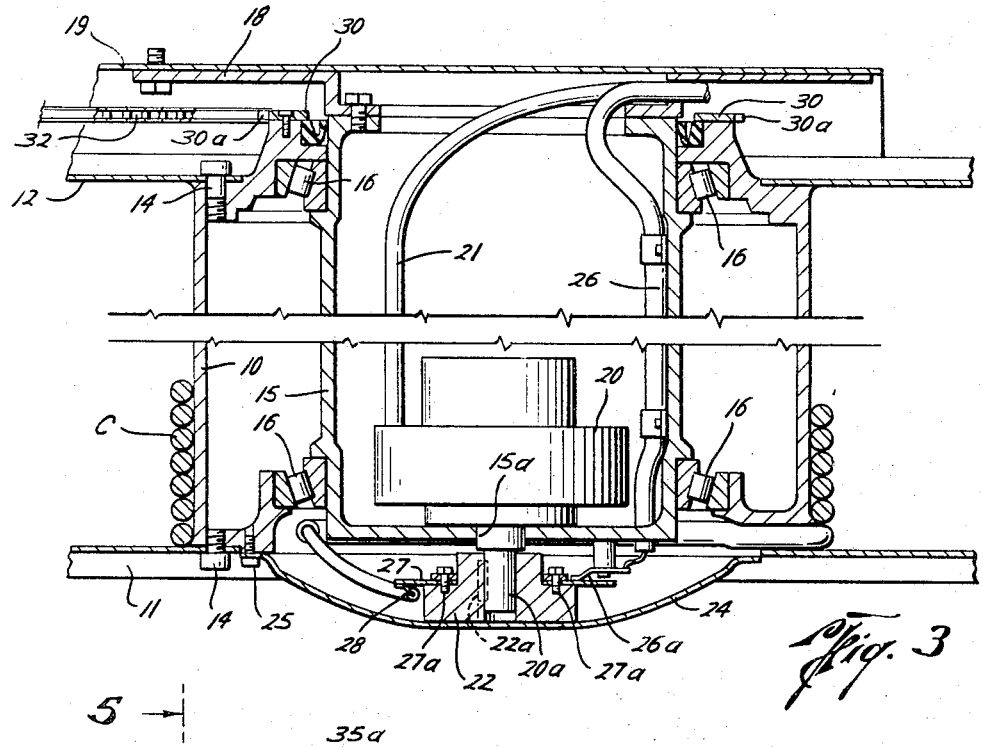
FIG. 3 is a view, partly in elevation and partly in section, taken on line 3—3 of FIG. 1.

Considering the invention more in detail, the reel R may be formed in a number of different ways, one of which is illustrated in the drawings, FIGS. 1–5 in particular. Thus, the reel R has a cylindrical drum 10 which is secured to side plates 11 and 12 by any suitable means such as screws 14 (FIG. 3). A central internal fixed support 15 is provided for mounting the rotatable drum 10 thereon, preferably using bearings such as indicated at 16 and which are of conventional construction. The central support 15 is preferably cylindrical and is attached to any fixed support frame such as indicated at 18, which in turn is mounted on a base or wall (not shown). A cover plate 19 is provided externally of the frame 18 and may be the wall or support base itself.

Within the cylindrical inner support 15 a motor 20 is mounted which may be operated by air or other fluid supplied through a tube or tubes 21. If the motor 20 is an electrical motor, the electrical lead wires will take the place of the tube 21 as will be well understood. The motor 20 has a shaft 20a extending through a suitable opening 15a in the cylinder 15, and such shaft 20a is connected to a drive hub 22 by a key 22a or other similar connecting means. The hub 22 is secured by screws or other suitable means to a drive plate 24 which in turn is connected to the rotatable drum 10 by means of a plurality of screws or bolts 25 or other suitable connecting means so that the rotation of the shaft 20a is transmitted to the drum 10 for rotating same.

If the cable C is an electrical cable or an antenna, a suitable lead-in wire 26 is provided through the fixed inner support 15. A contact finger or fingers 26a is adapted to engage an annular contact ring 27 mounted on the drive hub 22. The contact ring 27 is connected to the inner end 28 of the cable C. It is to be noted that the contact ring 27 is secured to the drive hub 22 by bolts or screws 27a or any other suitable securing means.

A sprocket 30 is secured to one side of the drum 10 and is rotatable therewith, such sprocket having the usual sprocket teeth 30a which engage with a drive chain 32 (FIG. 3). Such chain 32 extends to the level wind mechanism M (FIG. 1) as will be more evident hereinafter.

Considering now the details of the level wind mechanism M, such mechanism M has an end plate 35 which is secured to the wall or external plate 19 (FIGS. 2 and 5). The end plate 35 has an upper frame member 35a formed therewith or connected thereto which connects to an opposite end plate 36 (FIG. 2).

A pair of smooth surfaced guide rods 38 are also suitably attached to the end plate 35 and the end plate 36 for providing a guide for a guide block 40 during its lateral travel relative to the drum 10. An additional lower guide rod 39 (FIG. 4) is also provided for guiding the lateral movement of the guide block 40. A guide ring 41 having a suitable guide opening 41a therethrough through which the cable C is adapted to extend is mounted on the guide block 40 for movement therewith. It is to be noted that such guide or guide sleeve 41 is disposed at approximately the external circumference of the side plates or flanges 11 and 12 which, as will be more evident hereinafter, permits the feeding of the cable C from a point remote from the guide sleeve 41 at an excessively wide fleet angle while still providing a relatively small fleet angle from the guide 41 to the drum 10.

For imparting movement to the guide block 40, a pair of lead screws 50 and 51 are mounted substantially parallel to the guide rods 38 and 39 (FIGS. 4 and 5). In the preferred form of the invention, a drive sprocket 52 on lead screw 50 is driven by the chain 32. An intermediate clutch plate 53 is disposed between the sprocket 52 and a gear 54 which is also secured to the lead screw 50 (FIG. 5). The sprocket 52 is adjustably pressed into frictional engagement with the clutch plate 53 by a spring 56 and a nut 57. Such slip clutch is a safety device to permit the gear 54 and parts connected therewith to slip or stop if a person's hand or other obstruction gets into the equipment accidentally. Such slip clutch may be omitted if desired. The lead screw 51, which is to the rear of the lead screw 50 in FIG. 5 has a gear (not visible) secured thereon in meshing engagement with the gear 54. Each end of the lead screws 50 and 51 is mounted in a ball bearing support, one of which is indicated at 55 in FIG. 5. Both of the screws 50 and 51 have identical threads, preferably right-hand, which are in the same direction in the preferred form of the invention, but due to the use of the single drive sprocket 52 and the driven gear 54 on the screw 50, with the gear drive from the gear 54 to the gear meshing therewith on the screw 51, the screws 50 and 51 are rotated in the opposite direction to each other.

The lead screw 50 has a nut 60 mounted thereon which has thread grooves 60a corresponding to the thread screws 50a of the lead screw 50. A plurality of balls 61 forming ball threads is disposed in the grooves 60a and 50a to provide a substantially frictionless drive connection therebetween.

A sleeve 62 is mounted externally of the nut 60; such sleeve 62 has a plurality of circumferentially disposed pawl teeth 62a. Such sleeve 62 is keyed or is otherwise connected to the nut 60 and may be considered a part of the nut 60 since it moves therewith on the ball bearings 64 or other suitable mounting assembly.

The shaft 51 has an identical arrangement with respect to a nut 160 and ball threads 161 and pawl sleeve 162 which correspond with the nut 60, ball threads 61, and nut sleeve 62, respectively.

For the purpose of engaging either the nut sleeve 62 and its nut 60 with the guide block 40 or for alternatively engaging the nut sleeve 162 and its nut 160 with the guide block 40, a special mechanism, the details of which are shown in particular in FIGS. 4-8, is employed. Thus, a rotatable shaft 70 is mounted in the guide block for rotation. Such rotatable shaft 70 has a pair of notches 70a on opposite sides from each other for engagement by a ball 71 (FIG. 4). The ball 71 is resiliently urged upwardly into contact with the downwardly disposed notch 70a to releasably hold the shaft in one of two predetermined positions. At the left-hand end of the shaft 70 as viewed in the drawings, a shaft pin 70b is provided; and at the right-hand end of such shaft 70, a pin 70c is also provided 180 degrees therefrom. The pin 70b extends into a cam opening 73 in a latching element 74 which is slidable upwardly and downwardly relative to a substantially circular block 76 having a recess 76a for receiving the sliding latch element 74. The latch element 74 has a tooth or pawl 74a formed at its lower end, which is in the raised position as illustrated in FIGS. 4, 5, 7, and 8. In such position, the nut 62 is free to rotate with respect to the guide block 40.

For the purpose of rotating or turning the shaft 70, it is formed with two lever sections 70d and 70e. The lever section 70d is adapted to be engaged by a notched finger 77 which has a first notch 77a and a second notch 77b formed thereon. The finger 77 is pivotably mounted on a trigger 80 at a pivot pin 78. The finger 77 is urged in a counterclockwise direction as viewed in FIGS. 6 and 7 about the pivot pin 78 by a resilient means such as coil spring 81. The entire trigger 80 including the finger 77 therewith is urged to its extended position shown in FIG. 6 by a spring 82 which is carried on a shaft 83 disposed by any suitable means in the guide block 40. A suitable recess 40a is provided in the guide block 40 for the reciprocal movement of the trigger 80. Such trigger 80 is adapted to be actuated by contact with a stop button 84 on the end plate 35. During the normal turning movement of the shaft 70 to move the locking element 74 from its upper released position to the lower locking position, the trigger 80 is moved inwardly by engagement with the stop button 84 during the travel of the level wind mechanism M to the right as viewed in FIG. 2. The inward movement of the trigger 80 causes a rotation of the shaft 70 due to the engagement of the first notch 77a with the lever section 70b. During such turning or rotation of the shaft 70, the cam pin 70b moves from the mid area of the cam opening 73 (FIG. 7A) into the left-hand enlarged opening thereof (FIG. 7B). When the shaft 70 has been rotated just slightly more than ninety degrees, it then is caused to rotate with a snapping action due to the resilient urging by the spring 71a in conjunction with the ball 71 in the notch or recess 70a. Such snap action imparts a movement from the pin 70b to the cam section 73 (FIG. 7B) downwardly to move the locking element 74 downwardly to engage or position the tooth or pawl 74a within one of the spaces between the pawls 62a to thereby lock the nut sleeve 62 and the nut 60 to the guide block 40 through the latching element 74. When the latching element 74 has reached its latching position, the cam pin 70b has returned to the intermediate portion of the cam opening 73 (FIG. 7C). As will be more evident hereinafter, when the shaft 70 has thus been rotated so that the nut 60 is engaged with its lead screw 50, the direction of lateral movement of the entire mechanism M is reversed automatically, and it moves to the left as viewed in FIG. 2. Such movement of the mechanism M moves the trigger 80 away from the stop button 84 and then the spring 82 returns the trigger 80 to its extended position as shown in FIG. 6.

With respect to the retention of a latching element 74 in its upper and lower positions, reference is made to the use of the spring 85 which presses a ball 86 into either the upper or the lower detents 74b or 74c. Thus, the ball 86 is in the detent 74b when the latching element 74 is in the raised position shown in FIG. 4, but the ball is snapped into the detent 74c when the latching element 74 is moved downwardly to the nut engaging position.

A similar trigger 180 to the trigger 80 is provided on the opposite side of the guide block 40 (FIG. 5) for engagement with a stop button 184. The trigger 180 is formed in the same manner as the trigger 80 and has connected therewith a finger 177 which is identical with the finger 77, except that it moves in the opposite direction as indicated in FIG. 8. Such finger 177 is adapted to engage the lever section 70e to rotate the shaft 70 in a clockwise direction as viewed from the right-hand end of FIG. 7. The finger 177 has the two notches thereon corresponding to the notches 77a and 77b on the finger 77, but such detail is not shown since it is a duplicate of the structure shown for the finger 77. Likewise, a spring 182 (FIG. 4) is mounted on a pin 183 for returning the trigger 180 to its extended position shown in FIG. 8. The movement of the trigger 180 inwardly from its extended position causes a rotation of the shaft 70 to move the pin 70c within a cam opening 173 corresponding to the cam opening 73 in a latch element 174. A similar ball and detent arrangement including the spring 185, ball 186, and detents 174b and 174c are provided for holding the latch element 174 in either the upper or the lower position.

It should be pointed out that when the shaft 70 is rotated in either direction, both of the pins 70b and 70c are moved to change their relative positions. Thus, assuming the shaft 70 is rotated by the trigger 80 forcing the finger 77 to rotate the shaft 70, the pin 70b moves in a counterclockwise direction as viewed from the right-hand end of FIG. 7, and likewise the pin 70c moves in a counterclockwise direction. This causes the latch element 74 to move downwardly to engage the nut sleeve 62 while simultaneously, or substantially simultaneously, the pin 70c causes the latch element 174 to move upwardly to release it from engagement with the nut sleeve 162. If the trigger 180 is used for imparting the rotation to the shaft 70, rotation of the shaft 70 in the opposite direction occurs; and the pins 70b and 70c likewise rotate in the opposite direction accomplishing a shifting of the latch elements 74 and 174 substantially simultaneously.

In the operation or use of the apparatus of this invention, the cable C may either be fed to the reel R or it may be fed away from the reel R, in either case being fed through the reel level wind mechanism M. The rate of lateral movement of the guide block 40 and the rest of the mechanism M connected therewith is related to the rate of rotation of the drum 10 due to the driving of the lead screws 50 and 51 with the chain 32 and the sprockets 30 and 52. Thus, the gearing ratio from the reel to the level wind mechanism is such that for each revolution of the reel R, the level wind mechanism M moves laterally on the rods 38 and 39 and the lead screws 50 and 51 a distance slightly less than the diameter of the cable C being reeled or unreeled on the reel R. This causes a tight spooling of the cable C and keeps it level, also providing a small fleet angle from the cable guide 41 to the reel drum 10 during the laying or spooling of the cable C.

Because of such ratio of movement of the level wind mechanism M with respect to the rotation of the drum 10, the total lateral movement of the guide block 40 is less than the width of the drum 10 between the flanges 11 and 12, which results in the slight angle of spooling as illustrated in FIG. 2 and the small fleet angle referred to previously between the point of spooling the cable C on the reel 10 and the guide 41. However, it is to be observed that the fleet angle from the guide 41 to a point beyond the level wind mechanism M may be excessively wide without preventing the proper spooling of the cable C on the drum 10. The lead screws 50 and 51 are rotated in opposite directions and have the same thread grooves 50a formed thereon, which is preferably in a right-hand direction. However, the threads may both be left-hand threads if so desired. If it is assumed initially that the level wind mechanism M is moving from left to right as viewed in FIG. 2, and the cable C is being fed onto the drum 10 for spooling same, the level wind mechanism M will continue to move to the right until the trigger 80 engages the stop button 84 (FIG. 2) at which time the trigger 80 is moved inwardly together with the finger 77 for rotating the shaft 70 and switching the latch element 74 into engagement with the nut sleeve 62 while moving the latch element 174 out of engagement with the nut sleeve 162.

It is to be noted that during the movement of the guide block 40 to the right as viewed in FIG. 2, with the latch element 174 in engagement with the nut sleeve 162, the rotation of the threaded screw 51 imparts a movement to the guide block 40 since the nut sleeve 162 and the nut 160 therewith are prevented from moving relative to the guide block 40. Since the nut sleeve 62 and the nut 60 therewith are free to move on the roating lead screw 50 during such time, the movement of the guide block 40 imparts a movement to the nut sleeve 62 and the nut 60 therewith are free to move on the rotating lead screw 50 so that such nut 60 and the nut sleeve 62 actually rotate at twice the speed of the lead screws 50 and 51. Such driving of the nut 60 and the nut sleeve 62 on the lead screw 50 is made possible because of the substantially frictionless engagement obtained with the ball threads 61.

When the shaft 70 has been rotated to shift the latch elements 74 and 174, then the reverse action takes place, namely a driving of the drive block 40 because of the engagement of the nut sleeve 62 and the nut 60 with the guide block 40 through the latch sleeve 74. The nut sleeve 162 and the nut 160 rotate because they are driven by the movement of the block 40 and again, the substantially frictionless ball threads 161 make such movement possible.

Normally, the first notch 77a on the finger 77 is the only one that is utilized since it imparts slightly more than a ninety degree movement, at which time the snap action takes place as the edge of the shaft adjacent the next notch 70a moves into position with the ball 71, as previously explained. However, in some cases, it may happen that the operator will change the feeding in or feeding out of the cable C while the trigger 80 is in the shifted position inwardly and prior to the time that it has had an opportunity to be re-extended to the position shown in FIG. 6. If this occurs, the finger 77 will move further inwardly, and the second notch 77b will engage the shaft 70 at the lever section 70d and impart the rotation to the shaft 70 so as to again shift the shaft 70 to the next one-hundred eighty degree position so that the direction of movement of the level wind mechanism M is in the proper direction for either feeding in or feeding out of the cable C. It will be understood that the finger 177 likewise has both of the notches 77a and 77b for the purpose described above in connection with the finger 77.

The foregoing disclosure and description of the invention are illustrative and explanatory thereof, and various changes in the size, shape, and materials as well as in the details of the illustrated construction may be made within the scope of the appended claims without departing from the spirit of the invention.

What is claimed is:

1. A level wind apparatus for mounting on a reel, comprising:
   (a) a guide block having a guide for a cable or other elongate object to be spooled upon the reel,
   (b) a pair of lead screws extending laterally substantially parallel to the rotational axis of the reel,
   (c) means mounting said guide block on said lead screws for reciprocal lateral movement of the guide block relative to said reel,
   (d) means for automatically reversing the direction of movement of the guide block at the end of each length of lateral travel,
   (e) said means mounting said guide block including:
      (1) a nut rotatably mounted on each lead screw,
      (2) a releasable latch for releasably locking each nut to the guide block, and
      (3) a rotatable latch shaft having the releasable latches at each end thereof,
   (f) said means for automatically reversing the direction of movement of the guide block including:
      (1) a first trigger operably connected with said rotatable shaft for operation at one end of the lateral travel by said guide block for effecting a turning movement of said rotatable shaft to change the shaft from said second position to said first position, and
      (2) a second trigger operably connected with said rotatable shaft for operation at the other end of the lateral travel by said guide block for effecting a turning movement of said rotatable shaft to change the shaft from said first position to said second position.

2. The structure set forth in claim 1, including:
   (a) a means for limiting the extent of lateral movement of said guide block to a distance slightly less than the width of the reel.

3. The structure set forth in claim 1, including:
   (a) means for moving said screws for feeding said guide block so that for each revolution of the reel, the guide block moves laterally a distance slightly less than the diameter of the elongate object being wound or unwound to thereby feed the elongate object at a small fleet angle.

4. The structure set forth in claim 1, wherein:

(a) each of said triggers includes means for alternately releasing one of the releasable latches and engaging the other at each end of the lateral travel of the guide block.

5. The structure set forth in claim 1, including means for rotating said screws in response to rotation of the reel to effect the reciprocal lateral movement of the guide block only during rotation of the reel.

6. The structure set forth in claim 1, wherein said means for automatically reversing the direction of movement of the guide block includes:
   (a) a stop element on each side of the reel for engagement by one of the triggers to effect the reversal of the guide block.

7. The structure set forth in claim 1, wherein:
   (a) said means mounting said guide block also includes resilient means for retaining said shaft in a first selected position with one of said nuts locked to the guide block and in a second selected position with the other nut locked to the guide block.

8. The structure set forth in claim 7, wherein each of said nuts is mounted on its lead screw with ball type threads for substantially frictionless relative movement.

9. The structure set forth in claim 7, wherein each of said triggers is operably connected to said rotatable shaft by a ratchet finger, each of which has a first notch for normally engaging the shaft to turn same, and also a second notch for engagement with the shaft to further rotate the shaft so as to reverse the direction of movement of the guide block if the direction of feed of the elongate object is changed before the ratchet finger has retracted to re-engage the first notch with the shaft.

10. A level wind apparatus for mounting on a reel, comprising:
   (a) a guide block having a guide for a cable or other elongate object to be spooled upon the reel,
   (b) a pair of lead screws extending laterally substantially parallel to the rotational axis of the reel,
   (c) means mounting said guide block on said lead screws for reciprocal lateral movement of the guide block relative to said reel,
   (d) means for automatically reversing the direction of movement of the guide block at the end of each length of lateral travel, and
   (e) means for effecting a second reversing of the direction of movement of the guide block at each end of the lateral travel of the guide block in the event the direction of feeding of the cable is changed while the guide block is at one end of its travel.

References Cited
UNITED STATES PATENTS

| | | | |
|---|---|---|---|
| 1,276,810 | 8/1918 | Ragan | 74—58 |
| 1,826,758 | 10/1931 | Field | 242—158.4 |
| 1,918,587 | 7/1933 | Bryant | 74—58 |
| 2,421,269 | 5/1947 | Joyce | 242—158.4 |
| 2,437,725 | 3/1948 | Conner | 242—158.4 |
| 2,757,883 | 8/1956 | Schlang et al. | 242—158.2 |
| 2,959,978 | 11/1960 | Boutwell | 74—89.15 X |
| 2,964,261 | 12/1960 | Hambach et al. | 242—158.4 X |
| 3,159,046 | 12/1964 | Harned et al. | 74—424.8 |

STANLEY N. GILREATH, *Primary Examiner.*